United States Patent [19]

Points et al.

[11] Patent Number: 4,961,600

[45] Date of Patent: Oct. 9, 1990

[54] TANK COVER CLAMP

[76] Inventors: Dale E. Points, P.O. Box 662, Lakefork, Id. 83635; Timothy L. Everhart, Rte. 1, Box 21, McCall, Id. 83638

[21] Appl. No.: 509,557

[22] Filed: Apr. 16, 1990

Related U.S. Application Data

[63] Continuation of Ser. No. 325,238, Mar. 20, 1989, abandoned.

[51] Int. Cl.$^5$ .......................... E05B 65/00; E05C 9/00
[52] U.S. Cl. ....................................... 292/25; 292/55; 292/256.71; 292/256.5
[58] Field of Search ........... 220/320, 324, 325, 323 X; 24/278; 285/197, 198; 292/24, 25, 44, 45, 54, 55, 256, 260, 256.71, 256.5

[56] References Cited

U.S. PATENT DOCUMENTS

| | | | |
|---|---|---|---|
| 211,980 | 2/1879 | Farmer | 292/55 |
| 277,001 | 5/1883 | Chapin | 292/55 |
| 724,396 | 3/1903 | Pflugh | 220/325 |
| 1,174,055 | 3/1916 | Carlson | 292/256.71 |
| 1,308,794 | 7/1919 | Lynch et al. | 292/55 |
| 1,407,858 | 2/1922 | Harter | 292/55 |
| 1,884,403 | 10/1932 | Van Hecke | 285/198 |
| 2,355,475 | 8/1944 | Skaller | 220/323 |
| 3,135,438 | 6/1964 | Wex et al. | 292/256.71 |
| 3,173,572 | 3/1965 | Beecher | 220/323 |
| 4,662,287 | 5/1987 | Connell | 280/838 X |

FOREIGN PATENT DOCUMENTS

| | | | |
|---|---|---|---|
| 285340 | 5/1914 | Fed. Rep. of Germany | 220/323 |
| 556818 | 7/1932 | Fed. Rep. of Germany | 220/325 |
| 1580220 | 7/1969 | France | 292/45 |
| 2568 | 1/1972 | Japan | 285/198 |
| 343818 | 2/1931 | United Kingdom | 24/278 |

Primary Examiner—Eric K. Nicholson
Attorney, Agent, or Firm—Frank J. Dykas; Craig M. Korfanta

[57] ABSTRACT

A safety tank cover clamp 10 has first and second elongated claw members 24 and 25 pivotally attached to yoke member 11. Threaded cylindrical traveler member 17 is treadedly engaged with treaded throughhole 16 in yoke member 11. Upper end 18 of traveler member 17 has handle 20 pivotally attached thereto. Lower end 19 of traveler member 17 supports a pivotally mounted engagement foot 22 for engaging tank opening cover 3. Right and left springs 31 and 32 are each generally centrally attached to one of the elongated claw members. The second ends of right and left springs 31 and 32 are attached to pivotally mounted spring centering bracket 34 which itself is centrally and pivotally attached to yoke member 11.

6 Claims, 8 Drawing Sheets

TANK COVER CLAMP

This application is a continuation of application Ser. No. 07/325,238, filed 03/20/89, now abandoned.

BACKGROUND OF THE INVENTION

Technical Field.

1. This invention generally relates to devices for sealing tank covers and in particular to a safety device for sealing the cover of a vehicular tanker which is retrofitable over the standard tank cover.

Background Art.

2. Vehicular tankers are used to carry large quantities of liquids such as petroleum fuels, agricultural products, toxic chemicals, and the like. Normally the tanks on the tankers are provided with one or more circular openings in the top most wall of the cylindrical tank. Circular tank covers are provided to cover the circular openings. Generally the covers are hingedly attached at one side and clasped to the tank or opening flange at the other.

Obviously during use, the tanks are subjected to a tremendous amount of stress from the adjusting liquid load. As a result, the tank opening can be temporarily distorted, and the fluid allowed to leak out. Additionally, the vibrations associated with transit, over time, deteriorate the seal between the tank cover and tank opening. It should also be appreciated that whenever a tanker is involved in a vehicular accident, if the tank itself is subjected to any torsions or stress, and the tank openings can be distorted and the contents allowed to leak out. This can be disastrous in the case of petroleum fuels and toxic chemicals and certainly expensive in the case of agriculture products.

The solution to the leakage problem has heretofore simply been to discard the deteriorated cover and replace it with a new one. Unfortunately, this does not correct a leakage problem do to a distorted or damaged opening in the tank itself.

LYNCH, ET AL., U.S. Pat. No. 1,308,794, and HARTER, U.S Pat. No. 1,407,858, both teach conceptually similar tank closures. Here the common concept is the use of a cover including an adjustable sealing means so that the cover can be tightened as necessary to compensate for deteriorating seals. While the prior art covers do have the advantage of an adjustable seal, they are not retrofitable to the standard tanker tank and both are unduly complex for this particular application. Additionally, both of the prior art devices must be previously installed on the tank and consequently are of no use in remedying a leaking tank in the case, for instance, of a vehicular accident.

What is needed is a device which is readily retrofitable on the standard tank cover which serves to tighten the seal between the tank cover and tank opening which can be installed in both emergency and nonemergency situations.

It is therefore an object of the present invention to provide a safety sealing device which is retrofitable at any time to virtually any vehicular tank or tanker.

DISCLOSURE OF INVENTION

These and other objects are accomplished by a tank cover clamp which has a pair of opposing elongated claw members pivotally attached at opposite ends of central yoke member. The yoke member has a threaded throughhole for threaded engagement of a threaded cylindrical traveler member which is disposed for displacement between the opposing elongated claw members. A handle is pivotally attached at the upper end of the threaded cylindrical traveler member for imparting a rotation to the threaded cylindrical traveler member, thereby producing a displacement of the lower end of the threaded member.

A pair of springs are provided and each has one end attached to one of the opposing claw members and a second end attached to a pivotally mounted spring centering bracket which itself is centrally attached to the yoke member. The aforementioned spring system enables one handed installation of the tank cover clamp by producing essentially equal displacement of both opposing claw members away from the centrally located traveler member.

The lower ends of the elongated claw members are adapted to engage the retaining flange which circumscribes the opening on the tank. In the event the retaining flange is nonexistent, and for some reason undesirable, purchase handles are provided which can be permanently installed at opposing sides of the opening or temporarily installed using a belly strap which circumscribes the outer surface of the tank and disposes attached purchase handles at opposing edges of the tank opening. The belly strap embodiment is particularly well adapted to be carried by emergency personnel and used in the event of a vehicular tanker accident.

BEST MODE FOR CARRYING OUT INVENTION

Figure 1:
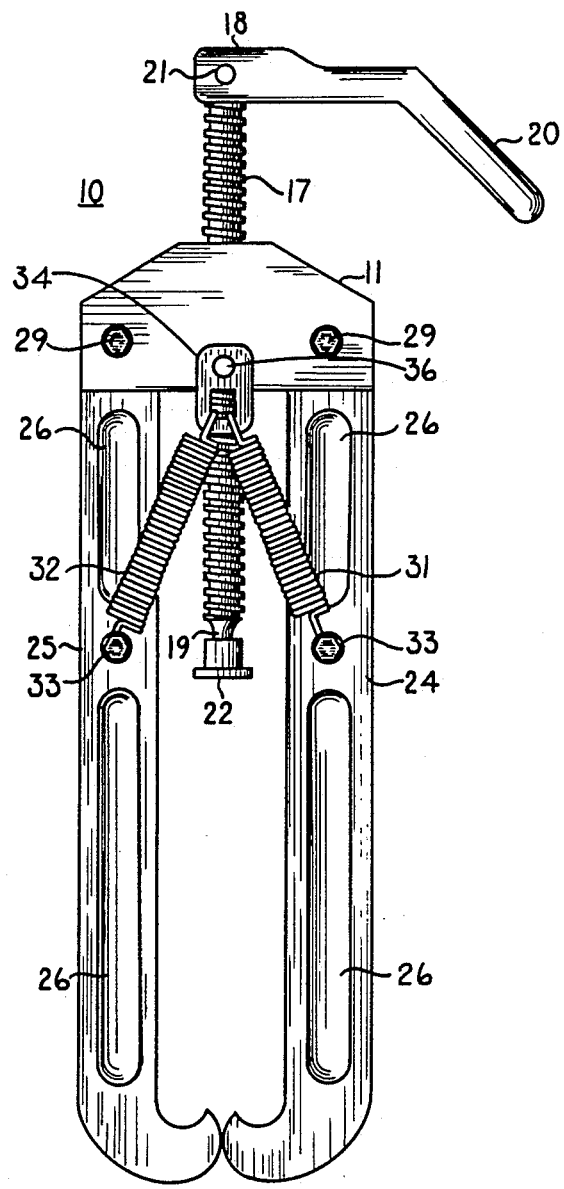
FIG. 1 is a plan view of a tank cover clamp.
Figure 2:
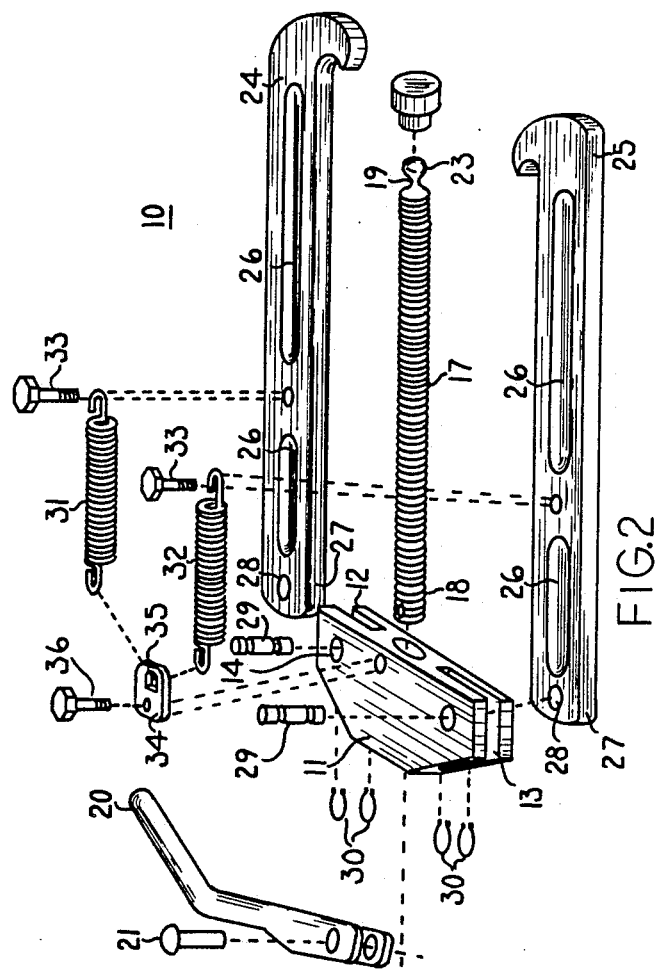
FIG. 2 is an exploded elevational representational view of the tank cover clamp.

Referring now to FIGS. 1 and 2, safety tank cover clamp 10 is shown. Tank cover clamp 10 is most easily constructed having yoke 11 threadedly engaged with cylindrical traveler member 17 which is centrally disposed between opposing right and left elongated claw members 24 and 25 for axial displacement therebetween.

Right and left elongated claw members 24 and 25 are each pivotally attached to yoke member 11 via claw pivot pins 29. Right elongated claw member 24 is pivotally attached to slotted first end 12 of yoke 11, via a grooved claw pivot pin 29 inserted through first pivot pin hole 14 and pivot pin hole 28. Claw pivot pin 29 is held in place by retaining rings 30. Identically, left elongated member 25 is pivotally attached at its rounded end 27 to second slotted end 13 of yoke member 11 by engaging a grooved claw pivot pin 29 with second pivot pin hole 15 and pivot pin hole 28. Again, claw pivot pin 29 is held in place by retaining rings 30.

Right and left claw members 24 and 25 are provided with weight reduction recesses 26 which serve to reduce the overall weight of tank cover clamp 10. Advantageously, tank cover clamp 10 is manufactured of a nonconductive copolymer or light weight metal such as aluminum. It should be appreciated that because of the application, tank cover clamp 10 must be of sufficient size and girth to withstand the adverse conditions.

Right spring 31 has a first end attached to right elongated claw member 24 via spring retaining pin or bolt 33. The second end of right spring 31 is slidably engaged with spring attachment aperture 35 in pivotally mounted spring centering bracket 34. Identically, left spring 32 is attached at its first end to left elongated claw member 25 via spring retaining pin or bolt 33. A second end of left spring 32 is slidably engaged with spring attachment aperture 35. Spring centering bracket 34 is centrally and pivotally attached to yoke member 11, via centering bracket pin 36.

Threaded cylindrical traveler member 17 is threadedly engaged with threaded transverse throughhole 16 in yoke member 11. Handle 20 is pivotally and radially attached to the upper end 18 of traveler member 17 by handle pivot pin or bolt 21. The lower end 19, of traveler member 17, is provided with a spherical foot bearing surface 23 for receiving an engaging pivotally mounted cover engagement foot 22. It can be seen from the drawings that as rotation is imparted to traveler member 17 by handle 20, cover engagement foot 22 is axially displaced between right and left elongated claw members 24 and 25.

Figure 3:
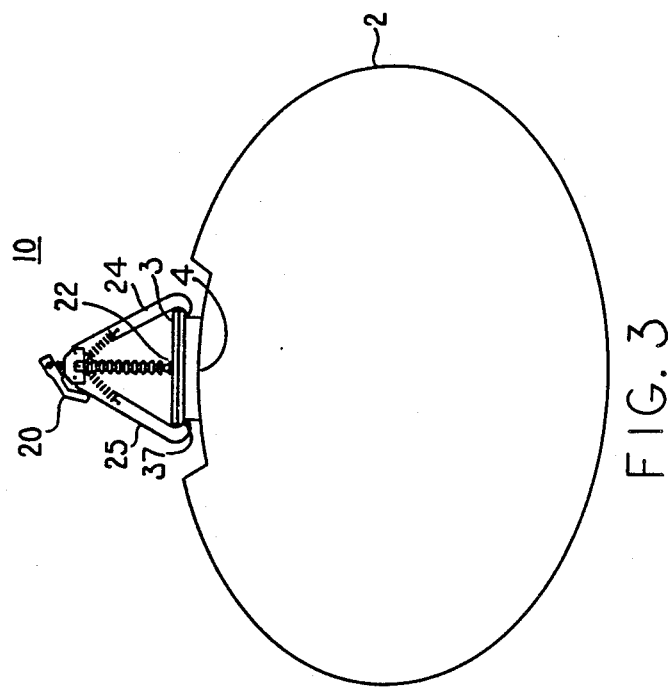
FIG. 3 is a side view of a tank cover clamp installed on the flanged opening of a vehicular tanker, which is shown in cross section.

Referring now to FIG. 3, retaining flange 37 is shown circumferentially attached around tank opening 4 of tank 2. In this particular embodiment, right and left claw members each engage retaining flange 37 while cover engagement foot 22 engages tank opening cover 3. Retaining flange 37 provides a purchase handle for right and left elongated claw members 24 and 25. As traveler member 17 is axially advanced toward tank opening 4, tank opening cover 3 is forced against retaining flange 37, thereby effectively sealing tank opening cover 3 and tank opening 4.

Figure 4:
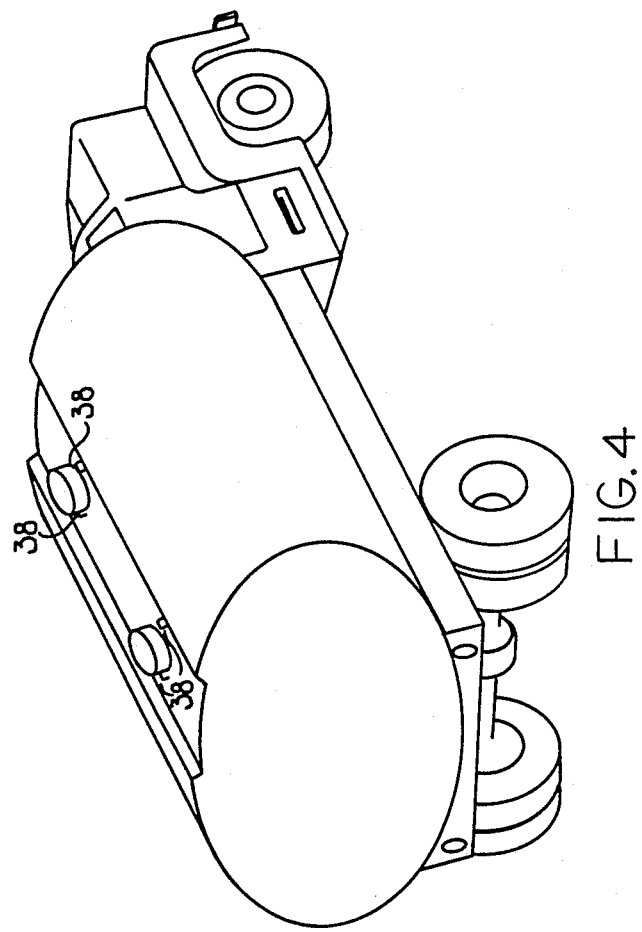
FIG. 4 is an elevational representational view of a vehicular tanker having purchase handles installed thereon for receiving the tank cover clamp.
Figure 5:
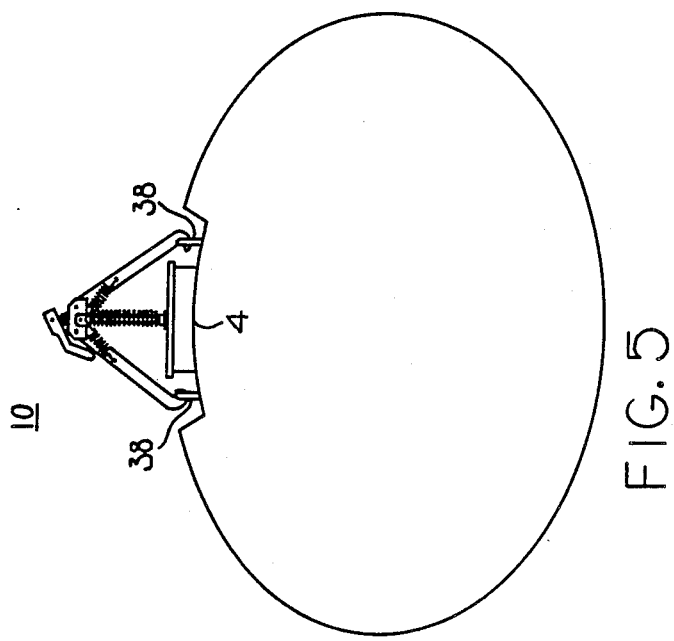
FIG. 5 a side view of a tank cover clamp installed on a vehicular, tanker using purchase handles.
Figure 6:
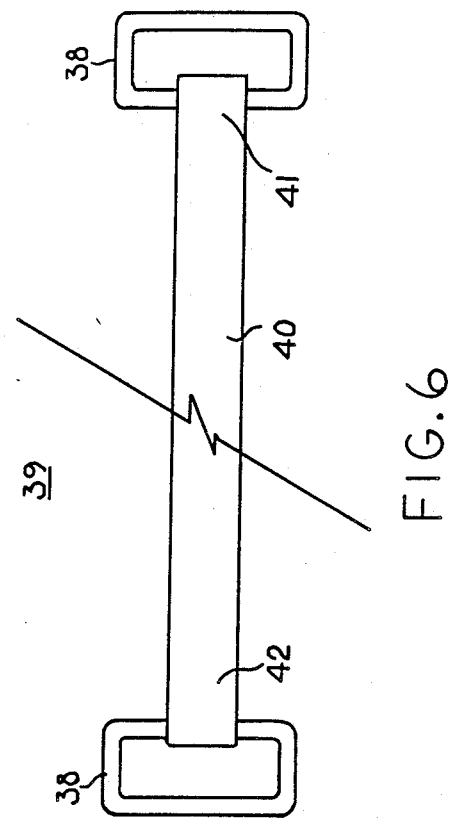
FIG. 6 is a plan view of a belly strap having purchase handles at each end.
Figure 7:
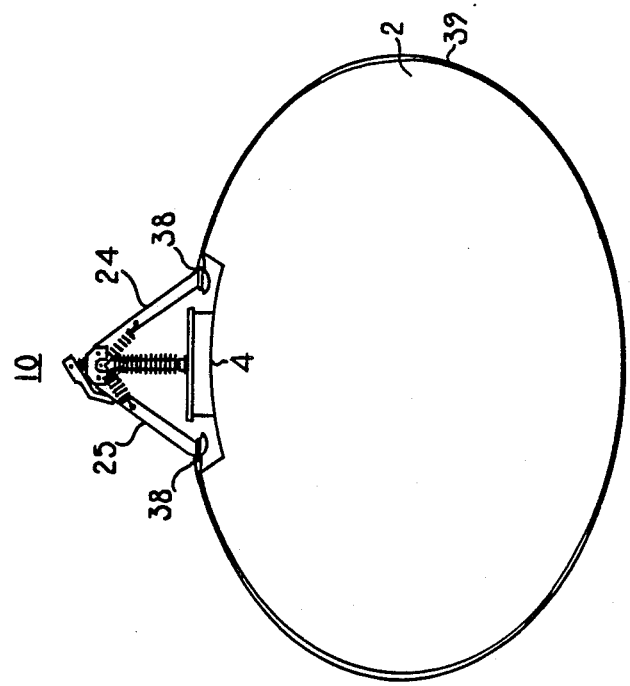
FIG. 7 is side view of a tank cover clamp installed on a tanker using the belly strap.

Referring now to FIGS. 4 and 5, a vehicular tanker 1 is shown having pairs of purchase handles 38 diametrically disposed and attached about tank openings 4. In this alternative embodiment, purchase handles 38 take the place of the retaining flange 37 shown in FIG. 3. Effective sealing of tank opening cover 3 with tank opening 4 is accomplished analogously. Referring now to FIG. 6, belly strap 39 is shown and is generally constructed from elongated flexible member 40 having purchase handles 38 attached at first and second ends 41 and 42. FIG. 7 shows belly strap 39 circumferentially installed around tank 2, again to provide a purchase for right and left claw members 24 and 25. This third embodiment is particularly useful in emergency situations where a leaking tank must be sealed which is not provided with a purchase point for tank cover clamp 10, as might be the case in a vehicular tanker accident.

Figure 8:
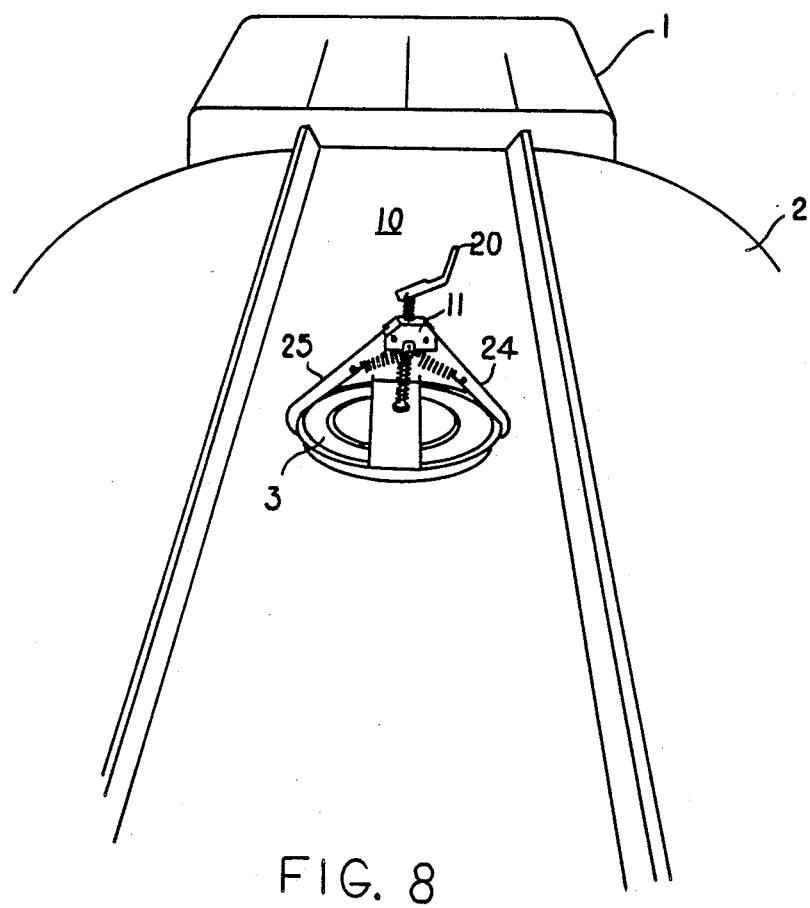
FIG. 8 is an elevational representational view of the tank cover clamp installed on a typical vehicular tanker.

FIG. 8 shows the standard application of tank cover clamp 10 wherein right and left elongated claw members 24 and 25 are engaged with retaining flange 37 which is installed around one of the openings on tank 2 of vehicular tanker 1.

While there is shown and described the present preferred embodiment of the invention, it is to be distinctly understood that this invention is not limited thereto but may be variously embodied to practice within the scope of the following claims.

We claim:

1. A safety sealing device for sealing the opening covers on the tank of vehicular tankers and the like, which comprises:
   a yoke member having a first end and a second end and a transverse throughhole centrally located therebetween;
   first and second elongated claw members, wherein said first claw member is pivotally attached to the first end of said yoke member and said second claw member is pivotally attached to the second end of said yoke member;
   said elongated claw members being configured for engagement with a purchase handle without contacting said cover;
   spring biasing means being centrally attached to said yoke member and to said first and second claw members, thereby urging said claw members toward a central point between said claw members and providing an equal displacement of said claw members therefrom during installation; and
   a traveler member including axial displacement means, being in cooperative engagement with the throughhole in said yoke member and further having first and second ends wherein the traveler member is disposed such that its first end lies between said first and second claw members, for axial displacement therebetween.

2. The safety sealing device of claim No. 1 wherein said traveler member and axial displacement means comprises:
   the throughhole in said yoke being threaded;
   a threaded cylindrical member having first and second ends and being in threaded engagement with the threaded throughhole and disposed such that the first end lies between said first and second claw members for axial displacement therebetween;
   a handle being radially attached to the second end of said cylindrical member for imparting a rotation thereto, thereby causing an axial displacement of said threaded cylindrical member.

3. On a vehicular tanker including a tank having openings therein and opening covers therefor, a safety sealing device for sealing the opening covers which comprises:
   a yoke member having a first end and a second end and a threaded transverse throughhole centrally located therebetween;
   first and second opposing elongated claw members wherein said first claw member is pivotally attached to the first end of said yoke member and said second claw member is pivotally attached to the second end of said yoke member;
   said elongated claw members being configured for engagement with a claw engagement means without contacting said cover;
   spring biasing means being centrally attached to said yoke member and to said first and second claw members, thereby urging said claw members toward a central point therebetween and providing an equal displacement of said claw members therefrom during installation;
   a threaded cylindrical traveler member having a first and second end and being in threaded engagement with the throughhole in said yoke member such that the first end of said traveler member is disposed between said first and second claw members;

a handle being radially attached to the second end of said traveler member for imparting a rotation thereto thereby causing an axial displacement of said traveler member; and a claw engagement means being attached to the tank and disposed adjacent the tank cover for receiving said first and second claw members and providing a purchase for sealing the cover.

4. The safety sealing device of claim No. 3 wherein said claw engagement means comprises a flange coaxially attached around the opening of the tank.

5. The safety sealing device of claim No. 3 wherein said claw engagement means comprises a pair of purchase handles being attached to the tank diametrically around the opening.

6. The safety sealing device of claim No. 3 wherein said claw engagement means comprises:

a belly strap having an elongated flexible member, including first and second ends, and further having a length essentially equal to the circumference of the tank minus the diameter of the opening;

first and second purchase handles wherein said first purchase handle is attached to the first end of said belly strap and said second purchase handle is attached to the second end of said belly strap; and said belly strap being circumferentially disposed about the tank such that said first and second purchase handles are diametrically disposed about the opening.

* * * * *